(No Model.)

C. THOMAS & J. W. HAVILAND.
ROTARY SHEARS.

No. 411,074. Patented Sept. 17, 1889.

Witnesses:
James F. Duhamel
Horace A. Dodge

Inventors:
C. Thomas
J. W. Haviland,
by Dodge & Sons
Attys.

UNITED STATES PATENT OFFICE.

CHARLES THOMAS AND JOHN W. HAVILAND, OF ELMIRA, NEW YORK.

ROTARY SHEARS.

SPECIFICATION forming part of Letters Patent No. 411,074, dated September 17, 1889.

Application filed May 27, 1889. Serial No. 312,304. (No model.)

*To all whom it may concern:*

Be it known that we, CHARLES THOMAS and JOHN W. HAVILAND, citizens of the United States, residing at Elmira, in the county of Chemung and State of New York, have invented certain new and useful Improvements in Rotary Shears, of which the following is a specification.

Our invention relates to rotary shears; and the invention consists in certain improvements hereinafter more fully set forth.

Figure 1:
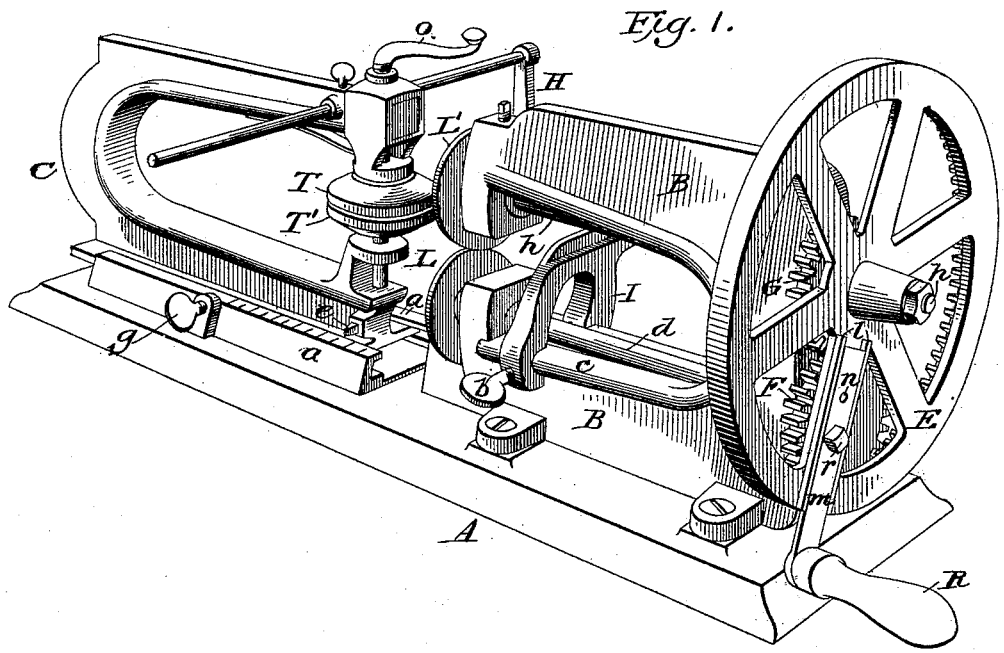
Figure 2:
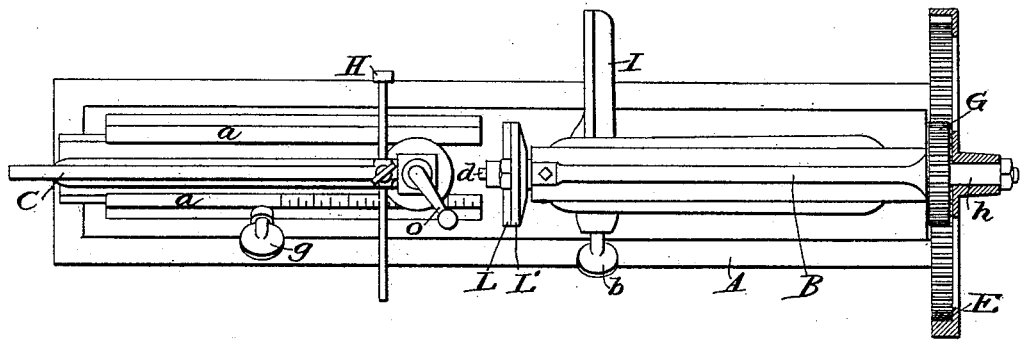

Figure 1 is a perspective view of the machine with our improvements applied thereto. Fig. 2 is a top plan view of the same.

Rotary shears for tinners' use have long been known, and they have been constructed in various ways.

The object of the present invention is to produce a machine of this character that can be operated by hand and by which the work can be much more rapidly done than by the shears or machines in ordinary use. To accomplish this result, we construct the machine as shown in the accompanying drawings, in which—

A represents the bed-plate, having a couple of ribs $a$ $a$ on its left-hand end, as shown clearly in Fig. 1, these ribs having grooves formed on their inner faces, in which the U-shaped frame C is mounted and arranged to slide to and fro, and is clamped or held in position when adjusted to the required position by a thumb-screw $g$, as shown in Figs. 1 and 2.

As shown in Fig. 1, the adjustable frame C is provided at its inner end with a pointer $e$, and the rib $a$ on that side has formed on its face a series of graduations or marks indicating inches and fractions of an inch to enable the frame C to be quickly and accurately adjusted for cutting disks of any required diameter. This frame C is provided with the rotary clamps T T' and the screw $o$ for tightening the same to clamp the sheet to be cut, and also with the adjustable gage H for centering the sheet, as usual, these all being well-known features in this class of machines.

The rotary shear-blades L L' are arranged in the usual manner, they being secured to the ends of shafts $d$ and $h$, which are mounted in another U-shaped frame B, which is rigidly attached to the bed-plate A, as shown in Fig. 1. On the opposite end of these shafts are rigidly secured two intermeshing pinions F and G, and on the end of shaft $h$, which is made to project beyond its pinion G for this purpose, is mounted loosely an internal gear-wheel E, of such a diameter as to cause its teeth to engage with the lower side of the pinion F on the lower shaft $d$, as shown in Fig. 1.

The wheel E has one of its arms cast with two ribs or projections $l$ $l$, arranged parallel to each other, so as to form a seat for the insertion of the bar $m$ of the crank or handle R, this crank-arm $m$ being provided with two or more holes $n$, or with an equivalent slot for the insertion of a bolt $r$, by which it is clamped to the wheel E, and by the loosening of which the crank can be adjusted so as to make it longer or shorter, and thus give more or less leverage or power, to adapt it to cut thicker or thinner sheets, as occasion may require.

By this arrangement, as will readily be seen, the speed of the shear-blades L and L' will be greatly accelerated, and consequently much more work can be done in the same time than can be with the ordinary machine, which has the crank attached directly to one of the shafts. It is obviously immaterial on which of the two shafts the driving-wheel E is mounted, so far as the result is concerned; but, as the machine will usually be set on a bench, it is preferable that the wheel E be mounted on the upper shaft, as shown, as otherwise it would project below the bed-plate, thus necessitating the placing of the machine at the end of the bench or support, so that the wheel and its crank could project down past the end or edge of the same, whereas by arranging it as shown the machine can be set on a table or bench in any position and be used without obstruction.

As shown in Fig. 1, the machine is provided with an adjustable gage I, secured to the lower arm of the frame B by a set-screw $b$, so it can be adjusted at any distance from the cutting-blades L L' that may be desired, it serving both as a gage and guide in trimming the edges of sheets, and also in cutting strips of uniform width from a sheet, the edge of the sheet bearing against the inner face of this gage I as it is passed through between the blades by hand, the frame C at such times being shoved back out of the way, or the clamps T T' being opened, so that the sheet may be passed through between them. A similar gage has before been used with rotary shears, and we do not therefore claim it as of our invention.

By this construction we are enabled to produce a machine adapted to the wants of sheet-metal workers, that can be used by hand in ordinary tin-shops, and by which the work can be more expeditiously done than by those in general use.

We are aware that machines have been made for cutting boiler-plate and the like by means of rotary cutters, in which spur-gear wheels were used to increase the power, said machines being ponderous stationary machines to be operated by a steam-engine or similar power, and not adapted to the wants or uses of ordinary tinners, for whose use our machine is especially designed. We are also aware that an internal gear-wheel *per se* is old, and therefore we do not claim such; but, Having fully described our invention, what we claim is—

1. The combination of the shafts $d$ and $h$, having the rotary blades L L', secured to one end, and the intermeshing pinions F and G, rigidly secured at their opposite ends, with the internal gear-wheel E, arranged to engage with one of said pinions and thereby impart an increased velocity to the cutters, substantially as and for the purpose set forth.

2. In combination with the gear-wheel E and the intermeshing pinions F G, arranged to impart motion to the rotary cutters L L', the crank R, adjustably secured to said wheel E, whereby the power applied may be increased or decreased to adapt the machine to cut metal of varying thicknesses, as herein set forth.

In witness whereof we hereunto set our hands in the presence of two witnesses.

CHARLES THOMAS.
JOHN W. HAVILAND.

Witnesses:
WM. B. PATTINSON,
WILLIAM S. SCOTT.